(12) United States Patent
Potter et al.

(10) Patent No.: US 11,601,578 B2
(45) Date of Patent: Mar. 7, 2023

(54) IR ILLUMINATOR TO AVOID CAMERA FIELD-OF-VIEW

(71) Applicant: Valeo North America, Inc., Troy, MI (US)

(72) Inventors: Brant Potter, Seymour, IN (US); John Orisich, Seymour, IN (US); Fred Roth, Seymour, IN (US); Kostadin Beev, Bobigny (FR)

(73) Assignee: Valeo North America, Inc., Troy, MI (US)

( * ) Notice: Subject to any disclaimer, the term of this patent is extended or adjusted under 35 U.S.C. 154(b) by 104 days.

(21) Appl. No.: 17/117,198

(22) Filed: Dec. 10, 2020

(65) Prior Publication Data

US 2021/0099625 A1 Apr. 1, 2021

Related U.S. Application Data

(63) Continuation of application No. 16/226,073, filed on Dec. 19, 2018, now Pat. No. 10,873,687.

(51) Int. Cl.
*H04N 5/225* (2006.01)
*B60R 1/00* (2022.01)

(52) U.S. Cl.
CPC ............ *H04N 5/2256* (2013.01); *B60R 1/00* (2013.01); *H04N 5/2252* (2013.01); *H04N 5/2254* (2013.01); *B60R 2300/103* (2013.01)

(58) Field of Classification Search
CPC .. H04N 5/2251; H04N 5/2252; H04N 5/2253; H04N 5/2254; H04N 5/2256; B60R 2300/103
See application file for complete search history.

(56) References Cited

U.S. PATENT DOCUMENTS

| | | | |
|---|---|---|---|
| 6,959,994 B2 | 11/2005 | Fujikawa | |
| 7,217,020 B2 | 5/2007 | Finch | |
| 7,804,251 B2 | 9/2010 | Wang | |
| 8,816,306 B2 | 8/2014 | Yano, Jr. et al. | |
| 8,854,467 B2 | 10/2014 | Onishi | |
| 10,160,376 B2 | 12/2018 | Shibata | |
| 10,873,687 B2 * | 12/2020 | Potter | ............... B60R 1/00 |
| 2009/0200496 A1 | 8/2009 | Barie et al. | |
| 2013/0155705 A1 | 6/2013 | Peck et al. | |
| 2020/0068103 A1 | 2/2020 | Huang | |

* cited by examiner

*Primary Examiner* — Timothy J Henn
(74) *Attorney, Agent, or Firm* — Valeo North America, Inc.

(57) ABSTRACT

An IR illuminator for providing infrared light for a digital camera having a camera lens with a camera field of view, including at least two mounting substrates arranged adjacent to the digital camera, at least one LED mounted to each of the mounting substrates for radiating the infrared light, and a free form cover lens positioned to cover the at least one LED. The shape of the free form cover lens is such that an emission pattern of light radiation is emitted without entering into the camera lens. Two IR illuminators adjacent to the camera are tilted at an angle from the camera optical direction. The shape of the free form cover lens may be elliptical or toric.

12 Claims, 19 Drawing Sheets

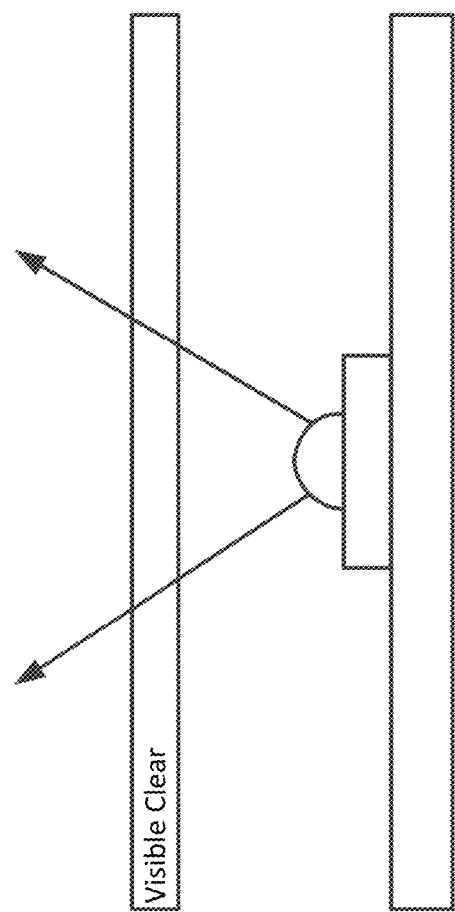 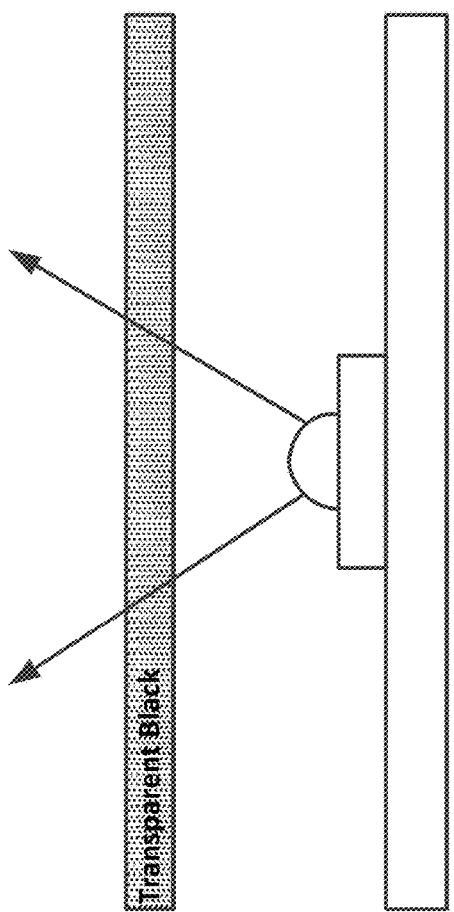

IR ILLUMINATOR TO AVOID CAMERA FIELD-OF-VIEW

CROSS-REFERENCE TO RELATED APPLICATIONS

This application is a continuation of U.S. patent application Ser. No. 16/226,073, filed Dec. 19, 2018, (now U.S. Publication No. 2020/0204713), the entire contents of which is incorporated herein by reference.

BACKGROUND OF THE INVENTION

Field of the Invention

The present disclosure relates generally to lighting for a vehicle vision camera, and in particular, IR illuminator design optimized to avoid camera field-of view.

Description of the Related Art

Camera systems play an important role in autonomous vehicles and driver assist systems. Vision cameras are the main sensor technology that can capture color and contrast information at a level of detail that enables object classification. Vision cameras enable driver assist system applications such as adaptive cruise control, automatic emergency braking, forward collision warning, automatic high beam control, traffic sign recognition, lane keep systems, parking assist, cross-traffic alert, and rear-view mirror. Vision cameras may be included inside the vehicle cabin for such features as gaze tracking, presence detection and gesture recognition. However, camera systems are susceptible to weather conditions and variations in lighting.

Camera systems for autonomous vehicles may be complemented with other types of sensors. A typical sensor arrangement for an autonomous vehicle is shown in FIG. 1. The arrangement of FIG. 1 includes long-range radar as a sensor for adaptive cruise control, and short/medium range radar for use in cross traffic alerting, rear collision warning, and blind spot detection. The arrangement may include several vision cameras, such as forward stereo cameras, surround cameras, rear and side cameras. Vision cameras 105, 107, 109 may facilitate features including traffic sign recognition, lane departure warning, digital side mirror, park assist, and rear view. Vision cameras, or optionally LiDAR 103 which is a sensor for the entire surroundings around the vehicle, may serve as a sensor for emergency braking, pedestrian detection, and collision avoidance.

One solution to enhance cameras for variations in lighting has been to use infrared (IR) light illuminators for image capture during low light and nighttime conditions. Infrared light may be used to augment the available ambient light. Since light emitted in the IR range is substantially invisible to humans, the lens for the IR illuminators may be made IR Black using black pigments that have low infrared reflectivity. Current IR illuminators use light emitting diodes (LEDs) as the light source. In order to provide directed light toward an object, IR illuminators often use IR LEDs without a secondary optic, such as a neutral cover lens. In this disclosure, a neutral lens is one that passes visible light and infrared light without applying optics. However, the radiation field of view (FOV) of the IR illuminator is limited by the IR LED (approximately half of +/−70 degrees).

SUMMARY OF THE INVENTION

According to an embodiment of the present disclosure, there is provided an IR illuminator for providing infrared light for a digital camera having a camera lens with a camera field of view, including at least two mounting substrates arranged adjacent to the digital camera, at least one LED mounted to each of the mounting substrates for radiating the infrared light, and a free form cover lens positioned to cover the at least one LED, wherein the size and shape of the free form cover lens is such that an emission pattern of light radiation is emitted without entering into the camera lens.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a schematic diagram for an IR LED illuminator having a clear cover lens;

FIG. 4 is a schematic diagram for an IR LED illuminator having a dark lens;

DETAILED DESCRIPTION OF THE PREFERRED EMBODIMENTS

Figure 1:
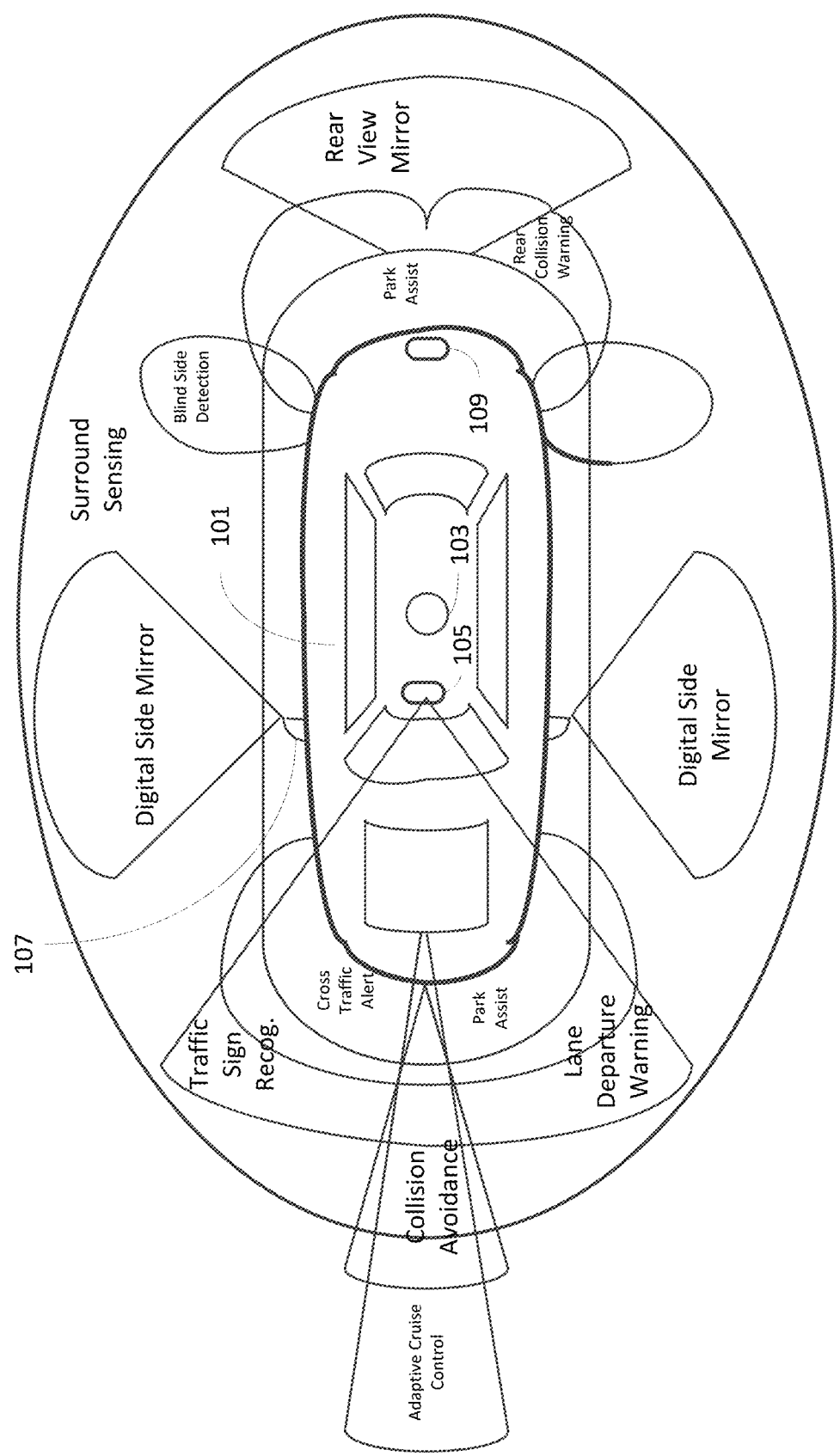
FIG. 1 illustrates a typical sensor arrangement for an autonomous vehicle.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" and "an" as used in this application and the appended claims are to be construed to mean "one or more" or "at least one" unless specified otherwise.

Furthermore, the terms "approximately," "proximate," "minor," and similar terms generally refer to ranges that include the identified value within a margin of 20%, 10% or preferably 5% in certain embodiments, and any values therebetween.

Referring now to the drawings, wherein like reference numerals designate identical or corresponding parts throughout the several views.

Vehicle mounted cameras typically have a field of view (FOV) up to +/−100 degrees. The half-angle emission of an LED in typical IR illuminators is in the range of approximately 45 to 70 degrees. It is desirable to increase the IR illuminator FOV to improve illumination for the camera FOV. Disclosed are embodiments having a secondary optic that increases the IR illuminator emission FOV while avoiding clipping/interfering with the camera FOV, and maintain high optical efficiency and radiation uniformity over the illuminator FOV in a compact design. Disclosed embodiments achieve these objectives by a combination of an IR optical design, i.e. design of the illuminator exit surface, and placement and orientation of the IR illuminator relative to the camera.

Figure 2:
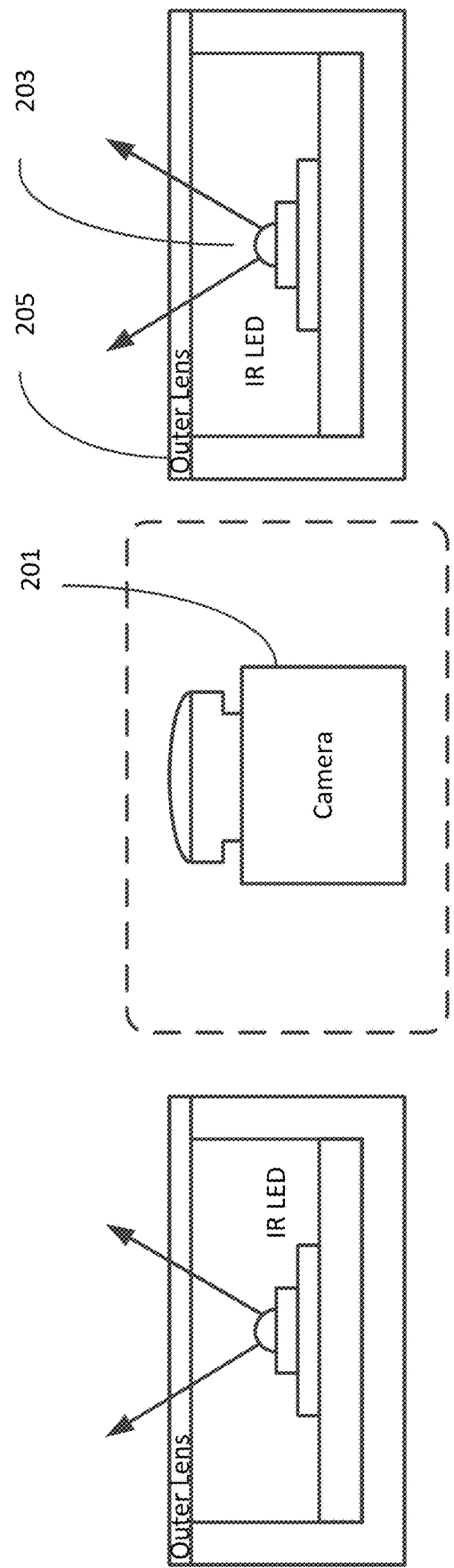
FIG. 2 is a schematic diagram for a camera having IR illuminators.

FIG. 2 is a schematic diagram for a camera having IR illuminators. Regarding FIG. 2, the radiation FOV of IR illuminators may be provided by mounting a pair of illuminators adjacent to the vision camera, as pod attachments. The camera 201 may have two adjacent IR LEDs 203, each having a flat outer lens 205.

The lens cover for the IR LED may be a neutral cover lens in which a half-angle emission of the LED is in a range of 45 to 70 degrees. A neutral cover lens provides no optical power and may be made of polycarbonate (PC) or polymethyl methacrylate (PMMA). PC may be used in the case of an external application that may be subjected to environmental conditions. As shown in FIG. 3 the cover lens may be clear, but as shown in FIG. 4 may include additives to make the lens dark. The dark lens blocks visible light and allows IR radiation to pass, and may be referred to as transparent black.

Figure 5:
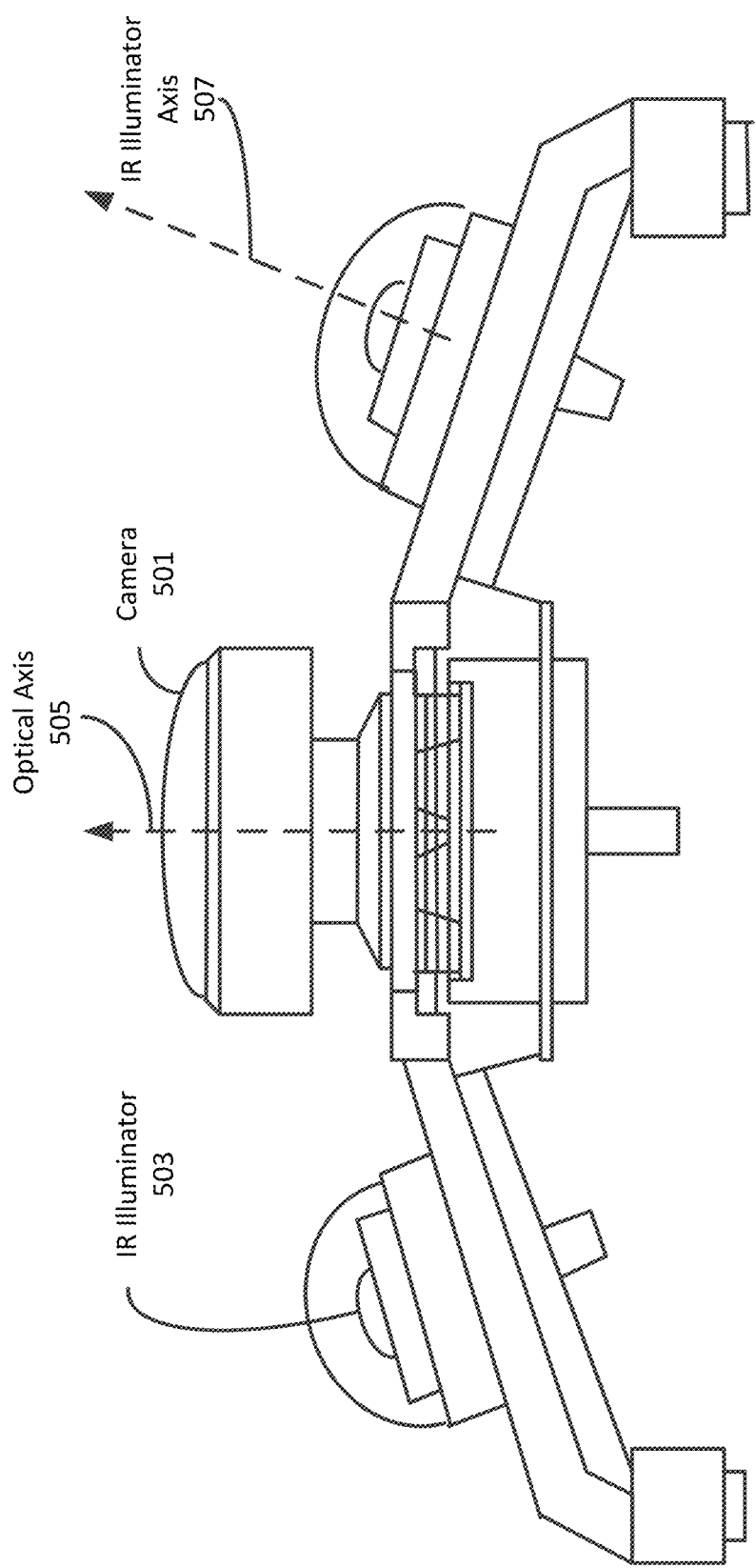
FIG. 5 is a schematic diagram for a camera with side-mounted IR illuminators in accordance with an exemplary aspect of the disclosure.

FIG. 5 is a side view of a camera with two adjacent IR illuminators in accordance with an exemplary aspect of the disclosure. Although the figure shows two IR illuminators, other configurations are possible. Some embodiments may include more than two IR illuminators mounted adjacent to a camera. For example, three IR illuminators may be mounted equidistant from each other around the camera at positions of apexes of an equilateral triangle. Four IR illuminators may be mounted on opposite sides of the camera. In each case, the number of IR illuminators is limited by the size of each IR illuminator, but may be chosen to meet lighting requirements for the camera. Also, the IR illuminators may be mounted on a substrate that forms a ring around the camera. The camera has a lens that provides an approximately +/−100 degree field of view for image capture and may be configured with a short range communications function. The short range communications function may be near field communication (NFC), WiFi or low energy Bluetooth, to name a few. It is preferable that the camera have a resolution of at least HD (1280 by 960 pixels). As will be discussed below, each of the pair of IR illuminators 503 has an illuminator axis 507 that is tilted at an angle of approximately 10 to 15 degrees from the optical axis 505 of the camera 501.

The LEDs in the IR illuminators may emit light ranging from 700 nm to 1 mm wavelength. Infrared light in the near-infrared region (700 nm to 1400 nm) may be sensed by a camera. It is desirable for a camera to sense color contrast against all sensed light. However, it is also preferable to avoid light directly emitted by the IR LED. One approach may be to include an IR filter. This approach leads to omission of infrared light in the near-infrared region. Another approach may be to use a camera filter that omits light in a wavelength above a certain level, such as above 900 nm in the case of an 850 nm LED source. In disclosed embodiments, the camera does not include an IR filter or includes a camera IR filter that allows infrared light in the wavelength range of the IR LED.

Figure 6:
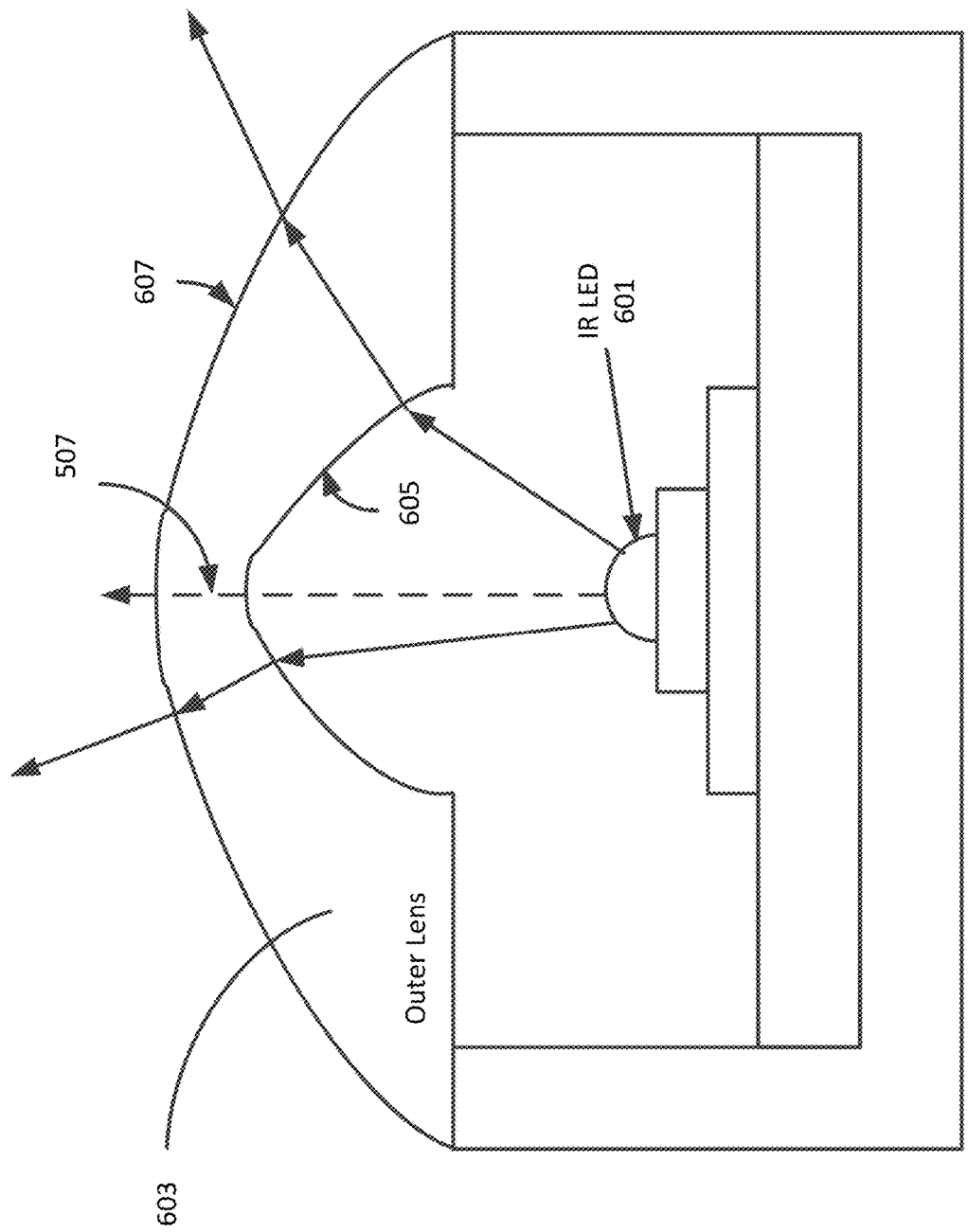
FIG. 6 is a schematic diagram for an IR illuminator in accordance with an exemplary aspect of the disclosure.

FIG. 6 is a schematic of an IR illuminator module in accordance with an exemplary aspect of the disclosure. The IR illuminator module includes an IR LED as the source of infrared light. The outer lens 603 may be a wide field of view lens having free-form optical surfaces. It is desirable to increase the radiation FOV of the IR illuminator emission pattern as compared to the emission from the base LED 601 and to improve radiation uniformity, in order to achieve optimum camera performance. In one embodiment, the outer lens 603 has an inner surface 605 that is of a different form than the outer surface 607. In the cross-section view as shown in FIG. 6, the slope of the inner surface 605 is at a steeper angle than the general slope of the outer surface 607. In other words, the thickness of the cover lens 603 at the base is greater than the thickness of the cover lens 603 at the center illuminator axis 507. The difference in thickness between the base and the illuminator axis may be a gradual change. In some embodiments, the difference in thickness may be more abrupt near the base of the cover lens 603 and be closer in angle near the illuminator axis 507. The steep slope of the inner surface 605 allows light to disperse at a wide angle in order to achieve a wider FOV of radiation. The difference in thickness of the lens 603 that becomes smaller towards the illuminator axis 507 helps to achieve uniform radiation over the FOV. Because each of the surfaces of the cover lens 603 may have their own free form shape, the outer cover lens 603 may function as a secondary optic. In one embodiment, the free form cover lens 603 may increase the radiation FOV of the illuminator emission pattern to a range of greater than +/−70 to approximately +/−90 degrees.

Figure 7:
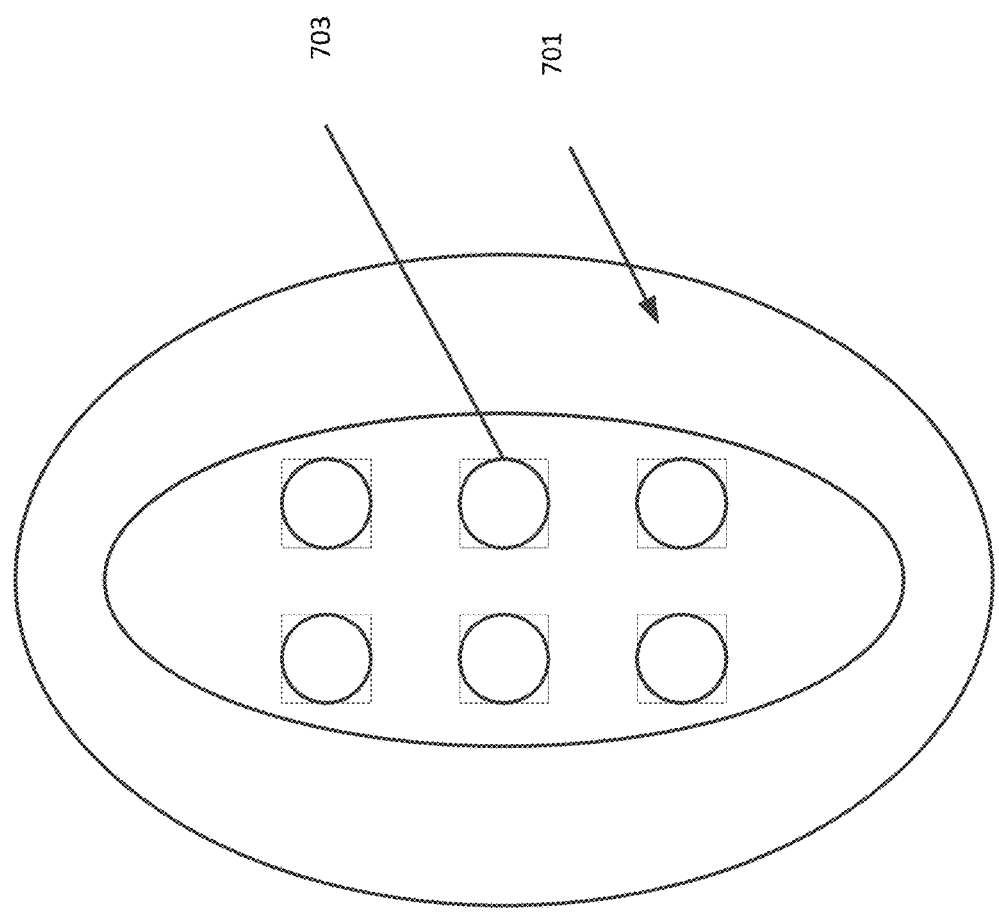
FIG. 7 is a front view of an IR illuminator in accordance with an exemplary aspect of the disclosure.

FIG. 7 is a perspective view of an IR illuminator having more than one LED under a free form optical cover lens. Regarding FIG. 7, in some embodiments, there may be six LEDs 703 within a single free form optical cover lens 701. In order to obtain a uniform maximum radiation, the arrangement of IR LEDs should be evenly distributed within the cover lens. A uniform maximum radiation pattern is the extent that the IR radiation emitted by the LEDs through the optical cover lens is maximum. The free form optical cover lens 701 may be substantially elliptical shape. The LEDs 703 may be arranged in pairs along the narrow direction of the elliptical lens 701 and the three pairs may be arranged along the long direction of the elliptical lens 701. In order to provide a uniform maximum radiation pattern, the LEDs 703 may be arranged equally spaced from neighboring LEDs within the cover lens 701.

Figure 8B:
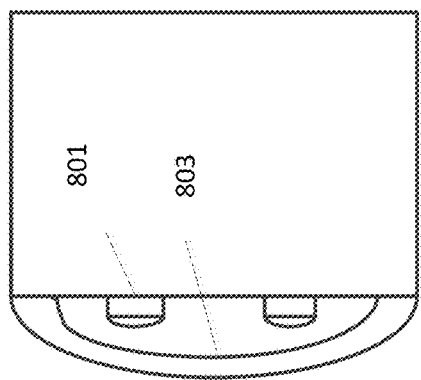
FIGS. 8A, 8B, 8C are views of a two LED IR illuminator in accordance with an exemplary aspect of the disclosure.
Figure 8A:
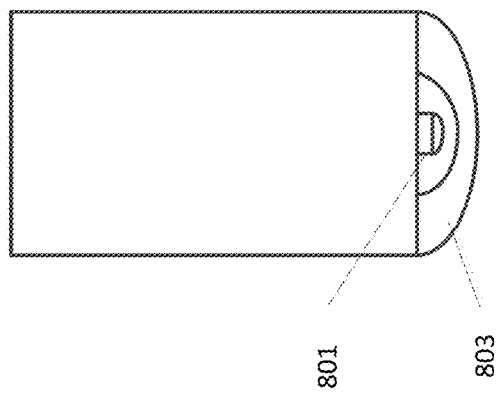
Figure 8C:
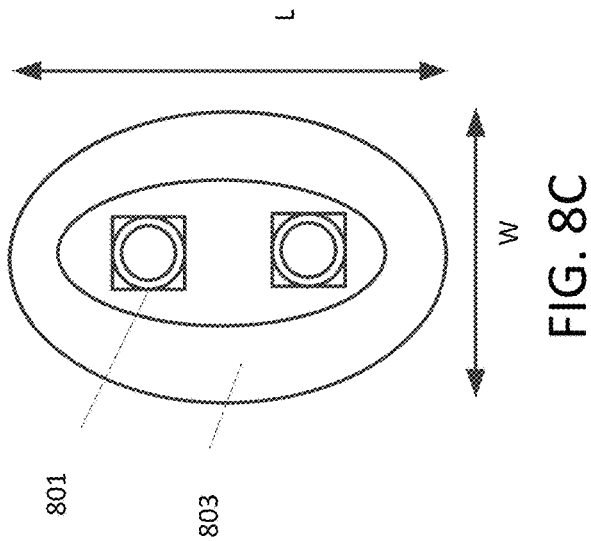

FIGS. 8A, 8B, 8C are views of an IR illuminator module with an elliptical cover lens in accordance with an exemplary aspect of the disclosure. The IR illuminator module has two LEDs 801 within a single cover lens 803. FIG. 8A is an end view of the IR illuminator module. FIG. 8B is a side view of the IR illuminator module. FIG. 8C is a top view of the IR illuminator module. In one embodiment, the elliptical cover lens has a length L that is approximately one and a half times greater than a width W. It should be understood that the size and shape of the elliptical cover lens is determined based on the camera and camera lens and installation requirements for a vehicle. In some embodiments, the lens material may be of a transparent thermoplastic such as polycarbonate PC. Other lens material may include plastic, glass, or glass laminant.

Figure 9B:
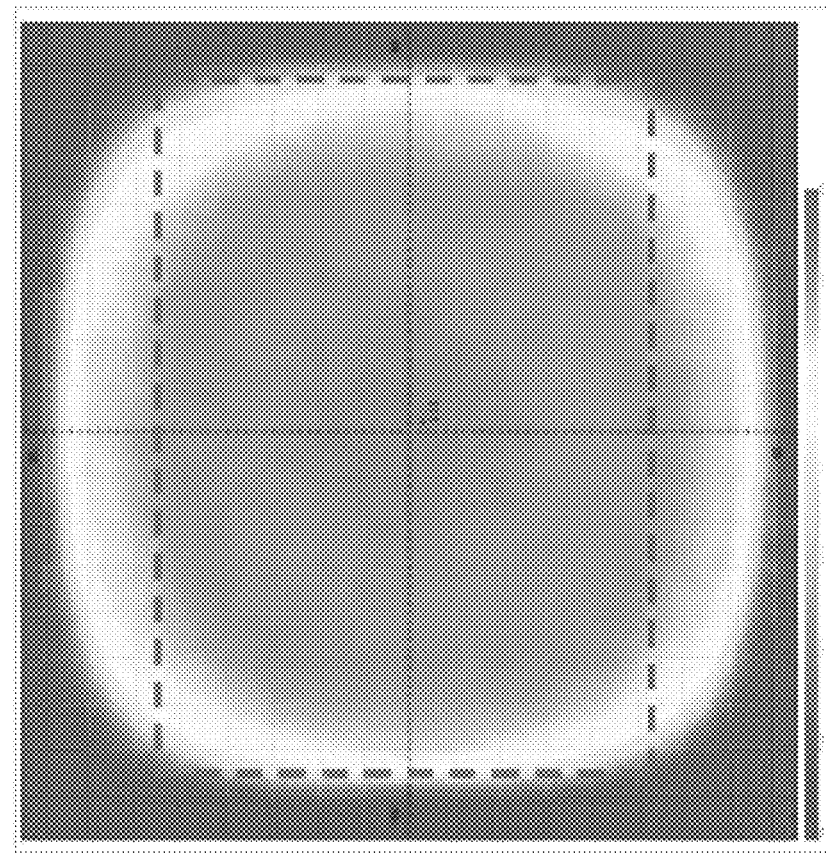
FIGS. 9A and 9B are plots for comparison of radiant intensity between an IR illuminator having a dome-shaped lens and an IR illuminator having a flat neutral lens.
Figure 9A:
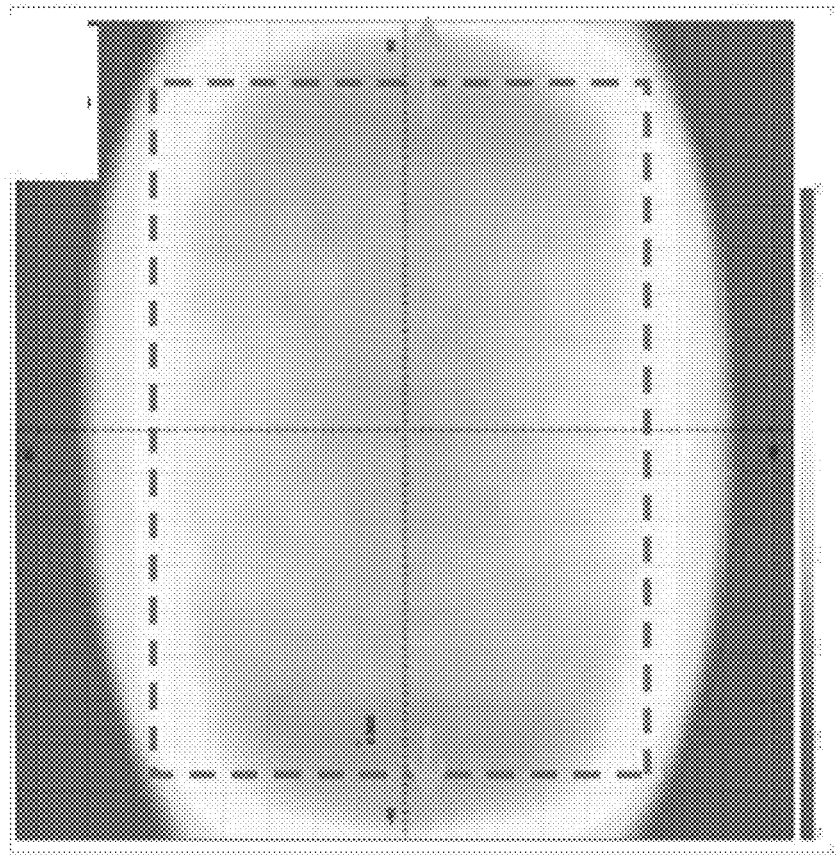

FIGS. 9A and 9B illustrate a comparison between the radiant intensity of two IR illuminator modules with the free form cover lens and IR illuminator modules having a flat lens. The plot in FIG. 9A illustrates that the IR illuminator modules with the free form cover lens has an increased radiation pattern and better uniformity than the LED with the neutral flat lens in FIG. 9B.

Figure 10:
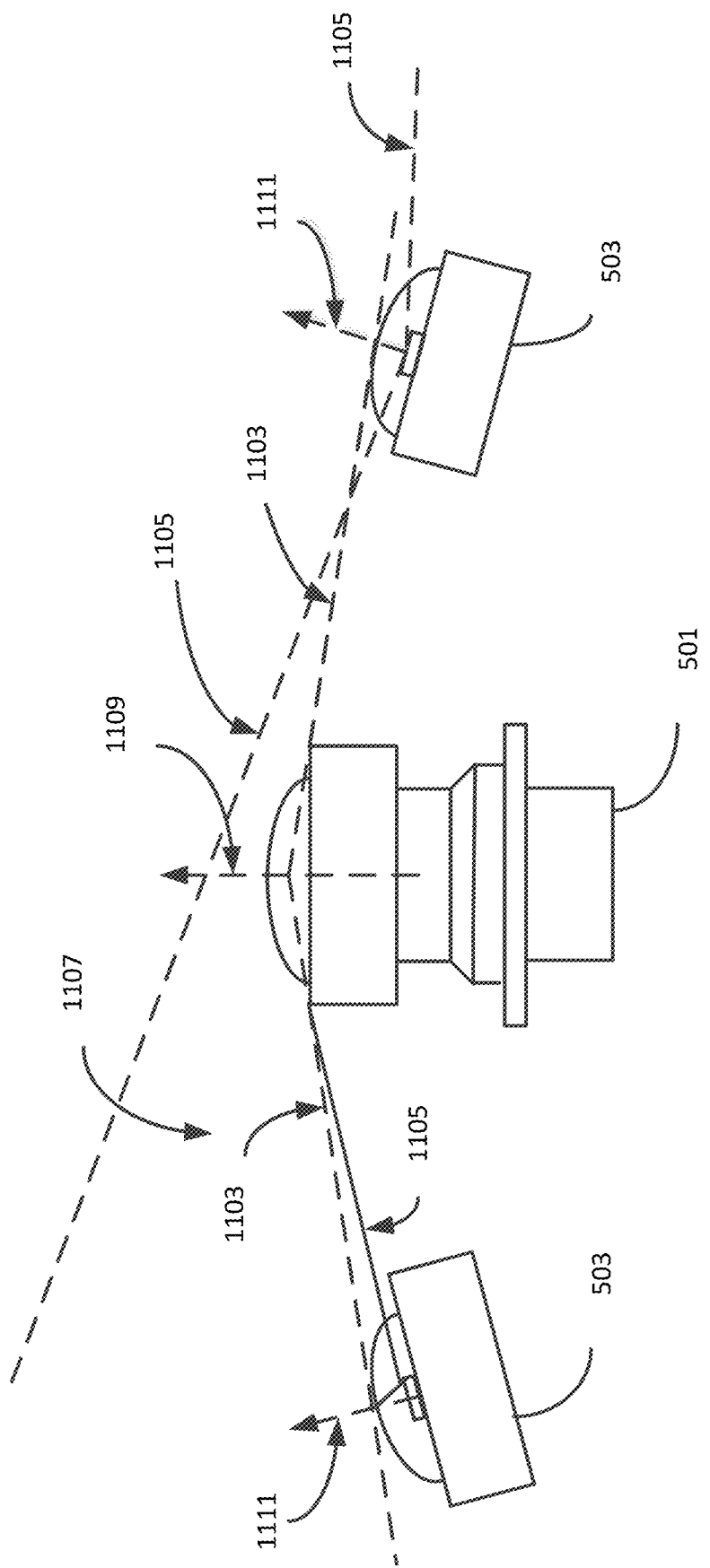
FIG. 10 is a schematic diagram for a camera with side-mounted IR illuminators that provide a lighting field of view over the field of view of the camera in accordance with an exemplary aspect of the disclosure.

FIG. 10 is a schematic illustrating the beam pattern FOV of the IR illuminator and the FOV of the camera. It is an objective to have an illuminator that radiates a beam pattern having the largest possible FOV to improve illumination in the camera FOV without parasitic light of the beam pattern reaching the camera. In disclosed embodiments, the IR illuminator is positioned relative to the camera to meet the following conditions. First, the top of the illuminator where light is emitted must be substantially below the FOV of the camera (see camera FOV 1103). This condition is to prevent parasitic light (such as sun reflections, scatter from dust on the illuminator lens) from reaching the camera. Second, the light cone of the IR illuminator (see light cone 1105) must substantially avoid intercepting/clipping the camera lens. This condition is to prevent IR illuminator radiation from getting inside the camera, and thus reducing image quality. In one embodiment, to reduce illuminator clipping of the camera, the illuminator axis 1111 is tilted approximately 10 degrees from the optical axis 1109 of the camera. The size of the tilt angle of the illuminator depends on the FOV requirements of the camera system. The tilt angle may be adjusted to the extent that the beam pattern of the IR illuminator is maximized.

Figure 11:
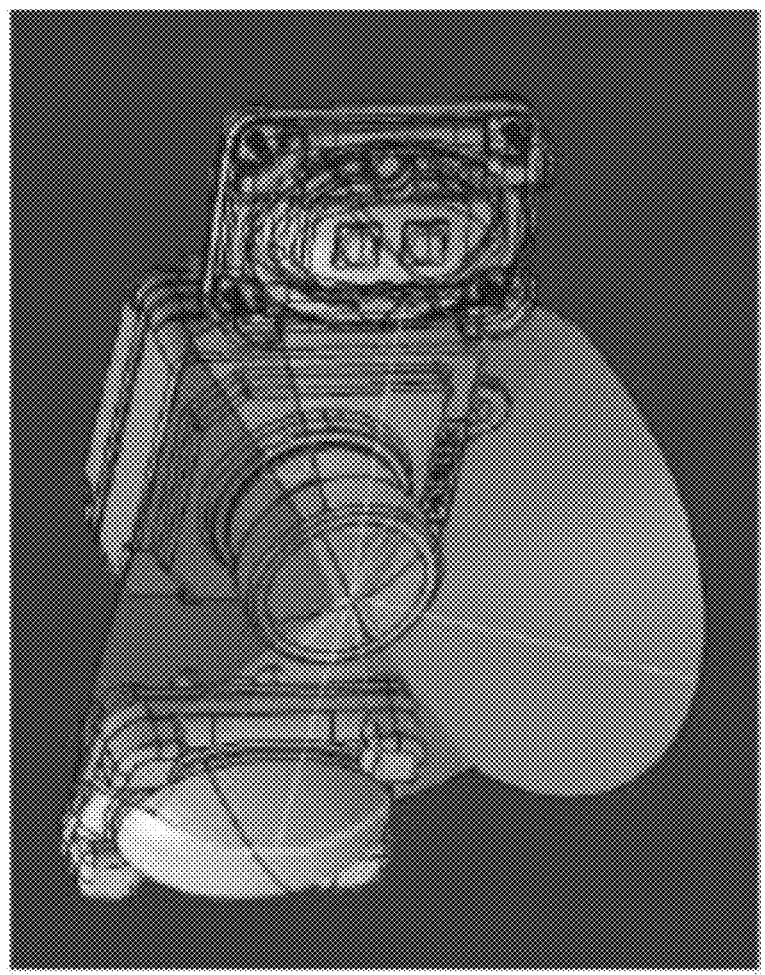
FIG. 11 is a perspective view of a camera and IR illuminator arrangement in accordance with an exemplary aspect of the disclosure.
Figure 12:
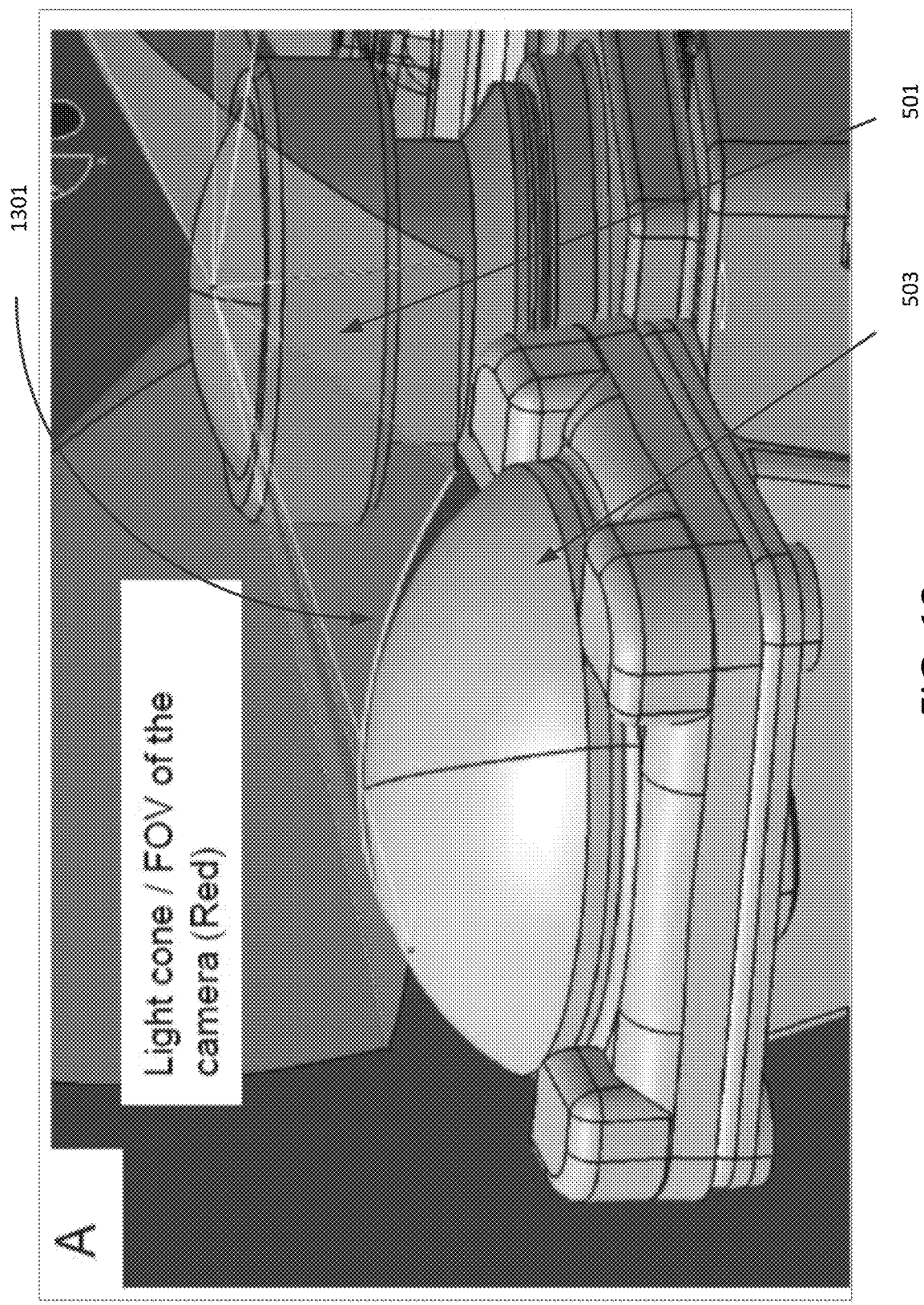
FIG. 12 is a perspective view of a IR illuminator and camera where the shape of the IR illuminator cover lens is based on the shape of the field of view of the camera.
Figure 13:
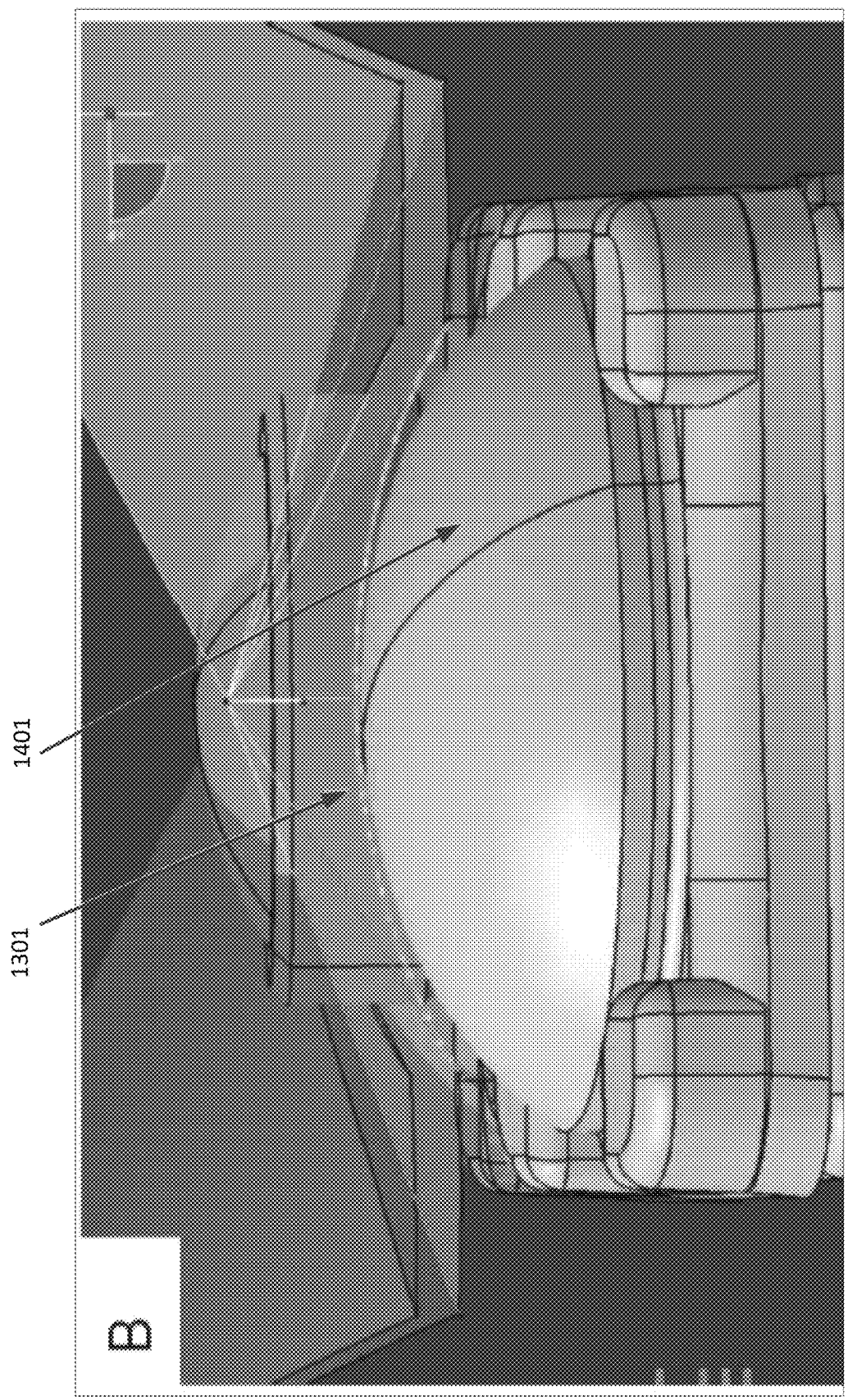
FIG. 13 is an alternative view of the IR illuminator and camera of FIG. 12.

FIG. 11 is a perspective view illustrating the beam pattern and camera FOV of FIG. 10. FIG. 12 is a perspective view illustrating the FOV of the camera 501 from the direction of one of the IR illuminators 503. The circular rim of the camera will limit a camera FOV boundary to a curved section at each side (see curve 1301). It is preferred that the IR illuminator optical surface be designed to conform to the shape of the camera FOV boundary. FIG. 13 is another perspective view of the camera FOV. The elliptical shape cover lens 1401 is preferably the same size and profile as the camera FOV (curve 1301). Designing the elliptical shape cover lens to conform to the camera FOV enables the IR illuminator to be placed as forward as possible toward the direction that the camera is facing. This increases the FOV of the illuminator pattern while reducing clipping of the camera geometry.

Figure 14:
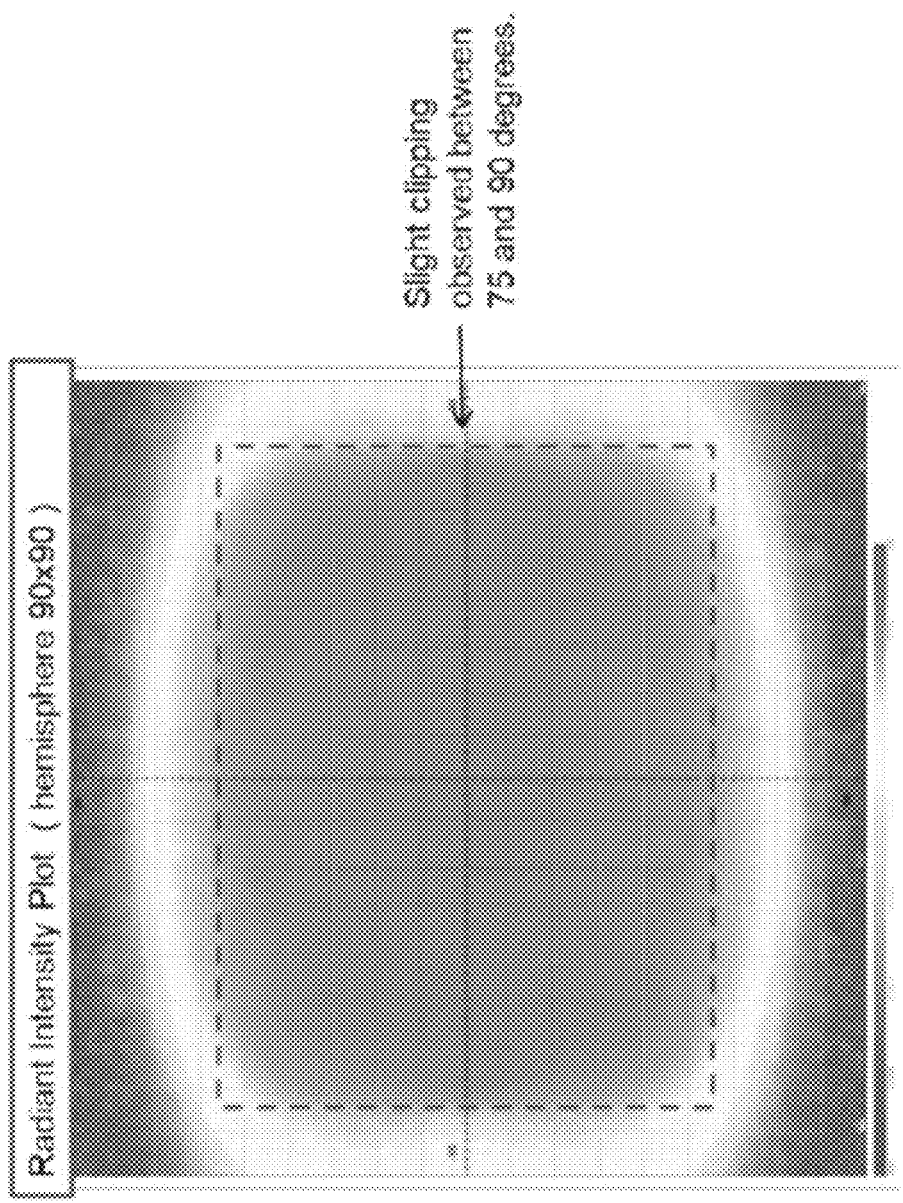
FIG. 14 is a plot of radiant intensity for the IR illuminator to show field of view of a pair of IR illuminator modules as in FIG. 10.
Figure 15A:
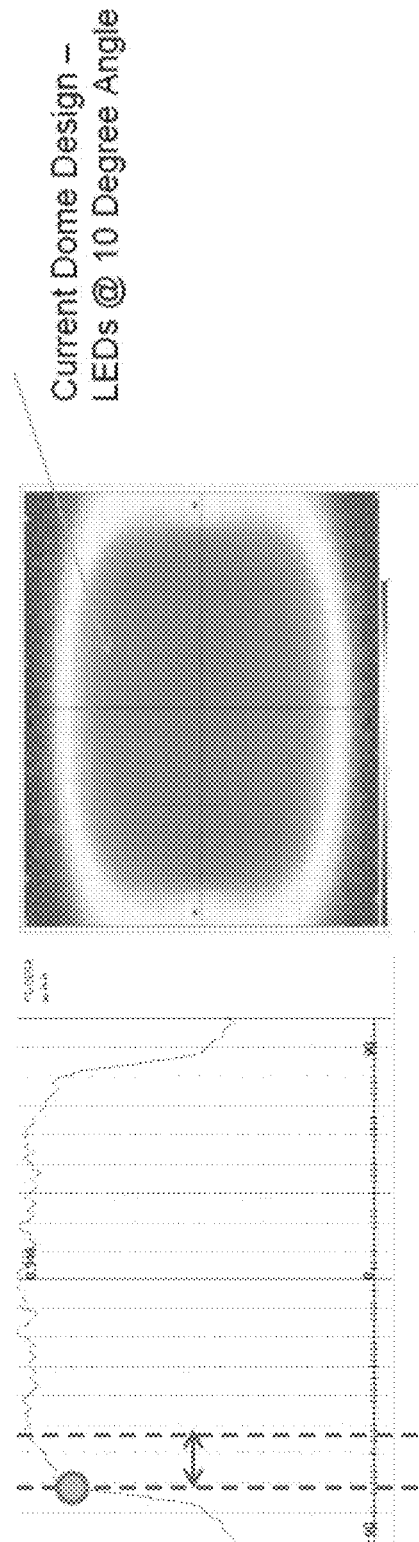
FIGS. 15A and 15B are plots for comparison of results to a flat neutral lens.
Figure 15B:
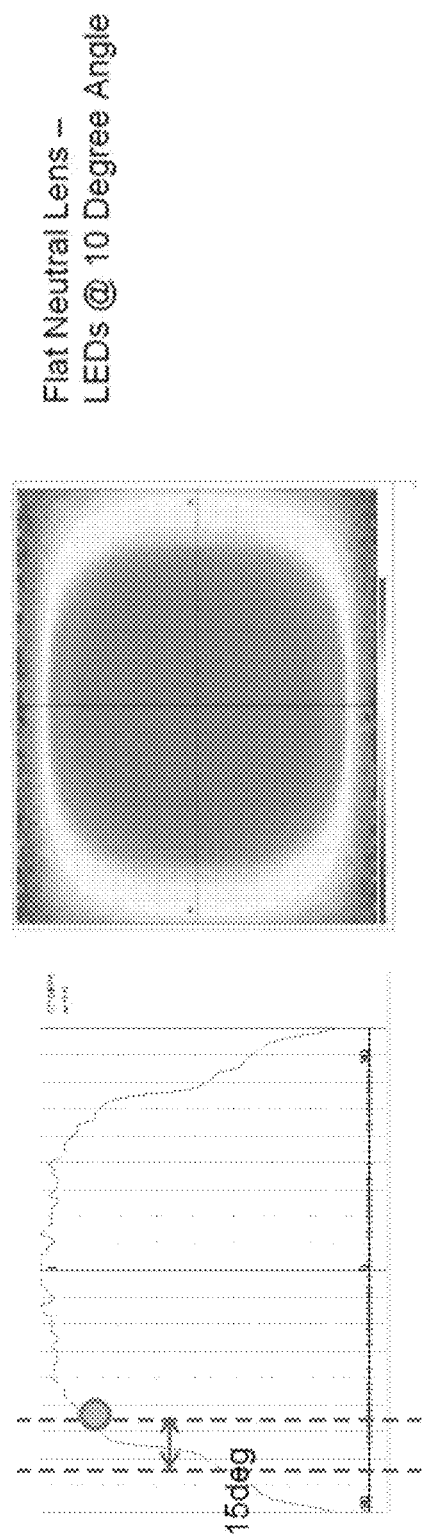

FIG. 14 illustrates the performance of the IR illuminator having the elliptical shape cover lens. The IR illuminator used for the plot in FIG. 14 includes two IR illuminator modules, each module having a pair of LEDs. The figure shows that there may be a slight clipping in the range of 75 to 90 degrees of the camera FOV. FIGS. 15A and 15B illustrate the performance improvement by the IR illuminator. With the IR illuminator positioned at a 10 degree tilt angle relative to the optical axis of the camera, FIG. 15A illustrates that approximately 15 degree improvement in radiation FOV can be achieved with a uniform contour compared to a IR illuminator having a flat neutral lens as shown in FIG. 15B.

Figure 16:
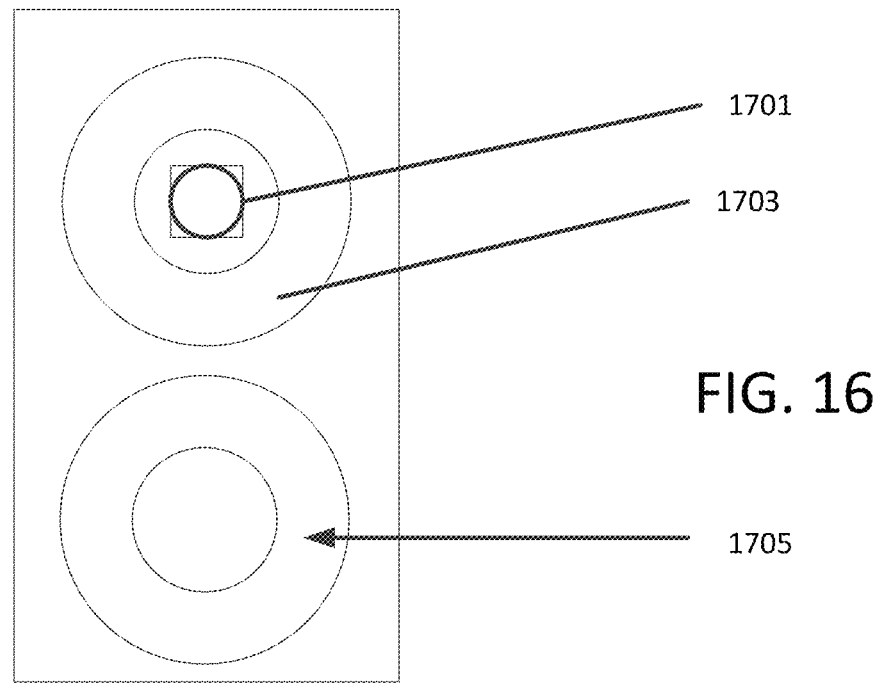
FIG. 16 is a front view of an IR illuminator having a single LED with two circular lenses.
Figure 17:
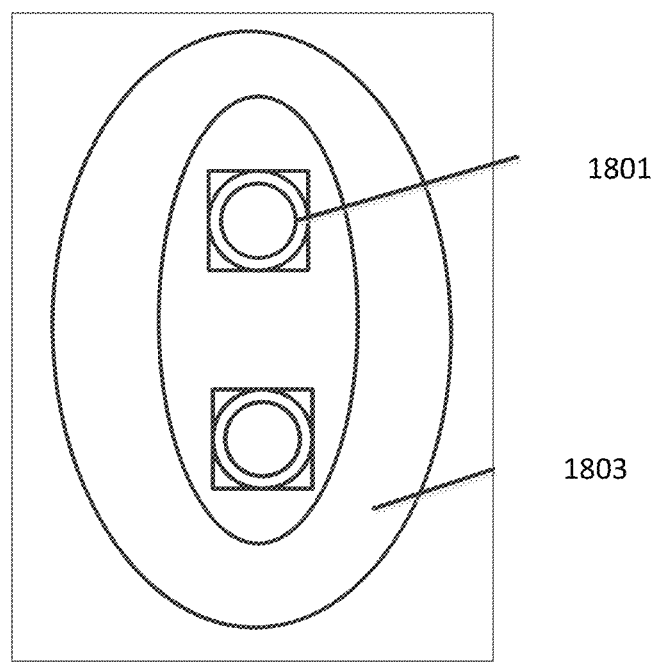
FIG. 17 is a front view of an IR illuminator having an elliptical cover lens.
Figure 18:
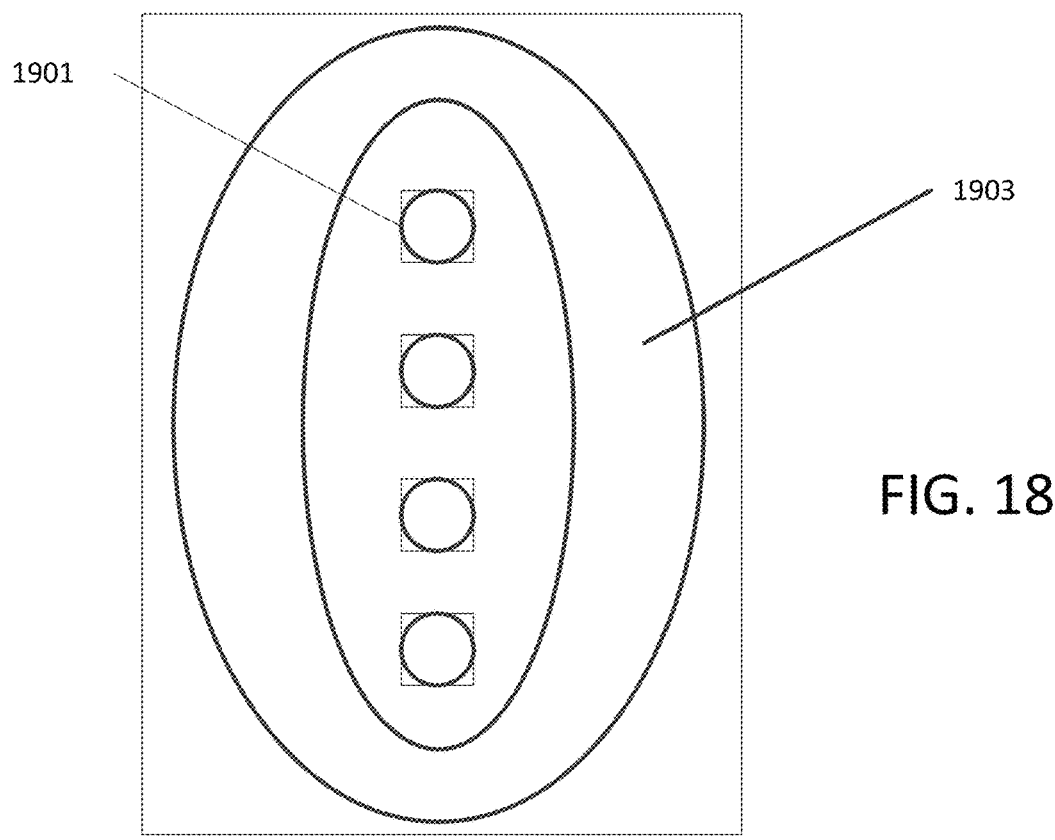
FIG. 18 is a front view of an IR illuminator having four LEDs.
Figure 19:
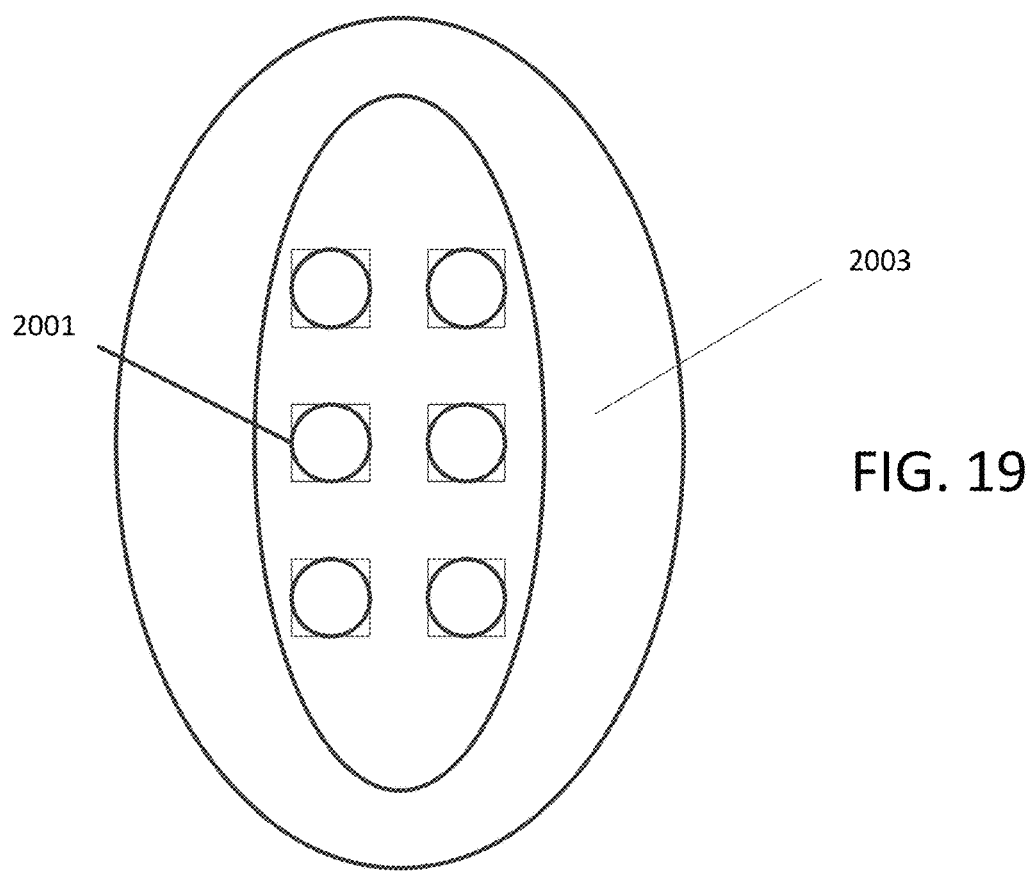
FIG. 19 is a front view of an IR illuminator having six LEDs.
Figure 20:
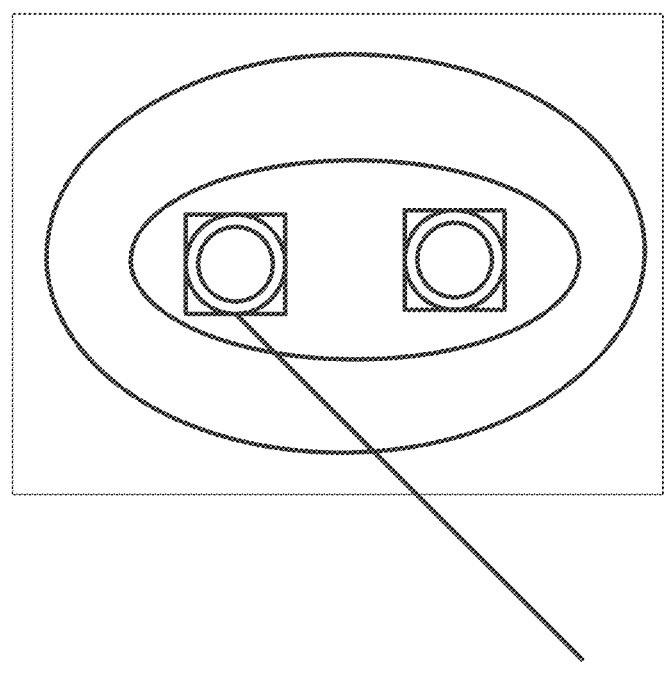
FIG. 20 is a front view of an IR illuminator having a LEDs arranged in the width direction.

Although an IR illuminator module as shown in FIGS. 8A, 8B, 8C has two LEDs and an elliptical cover lens, other embodiments of an IR illuminator module are possible. The number of IR LEDs may be varied depending on the amount and shape of light needed by the camera. For example, FIG. 16 illustrates an embodiment for an IR illuminator module having a single LED with multiple circular cover lenses. In this arrangement, a second cover lens 1705 may serve to redirect radiation projected from a first cover lens 1703 housing the LED 1701. FIG. 17 illustrates two LEDs 1801 within an elliptical cover lens 1803 for comparison. FIG. 18 is a perspective view of an IR illuminator having 4 LEDs inside one elliptical cover lens. Regarding FIG. 18, the 4 LEDs 1901 may be arranged as a linear array inside the long direction of the elliptical cover lens 1903. FIG. 19 is a view of an LED array with 6 LEDs 2001 inside one elliptical cover lens 2003. FIG. 20 is a perspective view in which the IR illuminator module is arranged to have a wider aspect. In some embodiments, such as that shown in FIG. 11, the width of each IR illuminator module is from an edge of the camera towards a direction away from the camera while a length direction of the IR illuminator module is approximately tangent to the circular camera lens. In these embodiments, the arrangement of multiple LEDs is along the length direction of the IR illuminator module. In alternative embodiments, the width of each IR illuminator may be made wider and accommodate an array of multiple LEDs 2101 arranged to extend in the width direction of the IR illuminator module, such as that shown in FIG. 20.

Figure 21B:
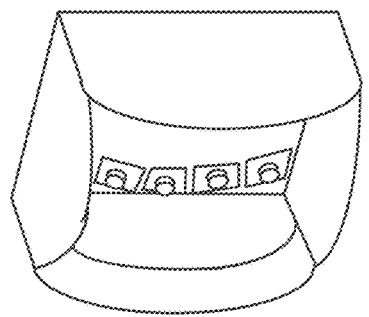
FIGS. 21A, 21B, 21C, 21D are view of an IR illuminator having a cover lens with a toric vertical cross-section.
Figure 21A:
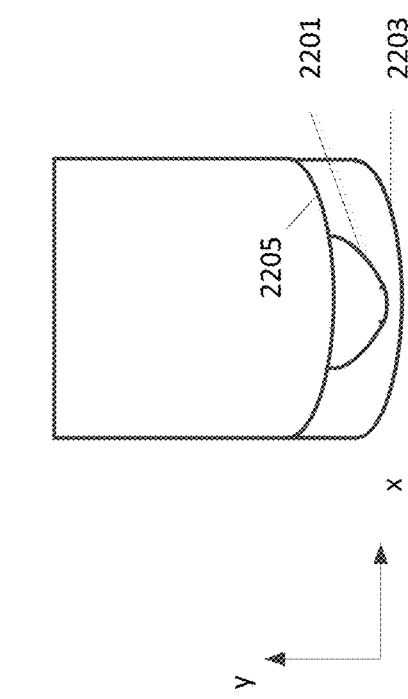

Also, embodiments of IR illuminators thus far have been for LEDs mounted on flat surfaces of substrates. The free form cover lenses for IR illuminators are applicable to LEDs mounted on rounded or curved surfaces. The cover lens of an IR illuminator module may be modified into a shape to accommodate an LED substrate that is curved or rounded. FIGS. 21A, 21B, 21C, 21D illustrate views of an IR illuminator module having a substrate with a rounded upper surface on which LEDs are mounted. A cover lens for the case of a rounded LED mounting substrate may be formed with a toric profile that has a different aspect but can still avoid the camera FOV. In general a toric lens has a shape like that of a torus (also known as a donut shape) and has behavior like that of a spherical lens in one direction and a behavior like that of a cylindrical lens in another direction. In some embodiments, the profile of the cover lens may be such that the horizontal cross-section is ellipsoidal and the vertical cross-section is toric. As such, the cover lens exhibits different refractive powers. FIG. 21A is a view showing the ellipsoid profile in horizontal cross-section (x-y). FIG.

Figure 21D:
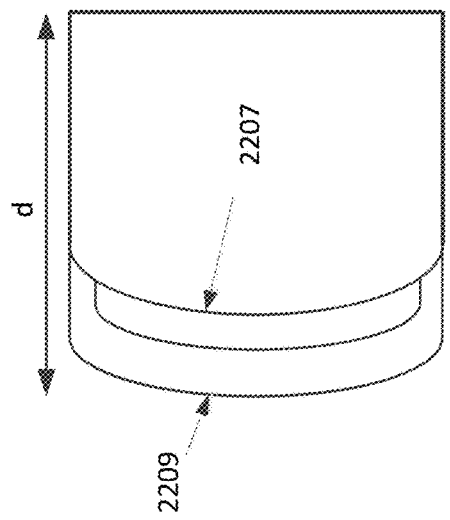
Figure 21C:
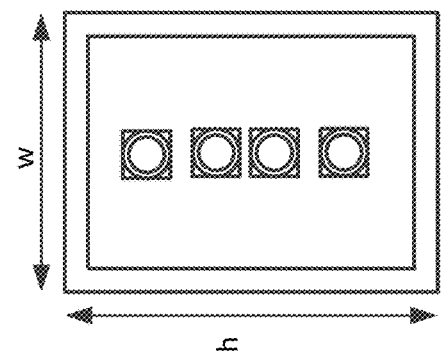

21B illustrates a perspective view of the IR illuminator. FIG. 21C is a view of the LEDs through the cover lens. FIG. 21D is a view showing the toric profile in vertical cross-section (y-z). Regarding FIG. 21A, similar to other embodiments the inner surface profile 2201 of the cover lens has a steeper slope than the outer surface profile 2203 and can achieve a radiation pattern of approximately +1-90 degrees. Regarding FIG. 21D, the toric profile 2209 may match the shape of the curved or rounded surface 2207 of the LED substrate. Provided the toric profile, the lens has behavior like that of a spherical lens. The horizontal cross-section 2203 of the cover lens may also match the shape of the rounded substrate 2205.

Figure 22:
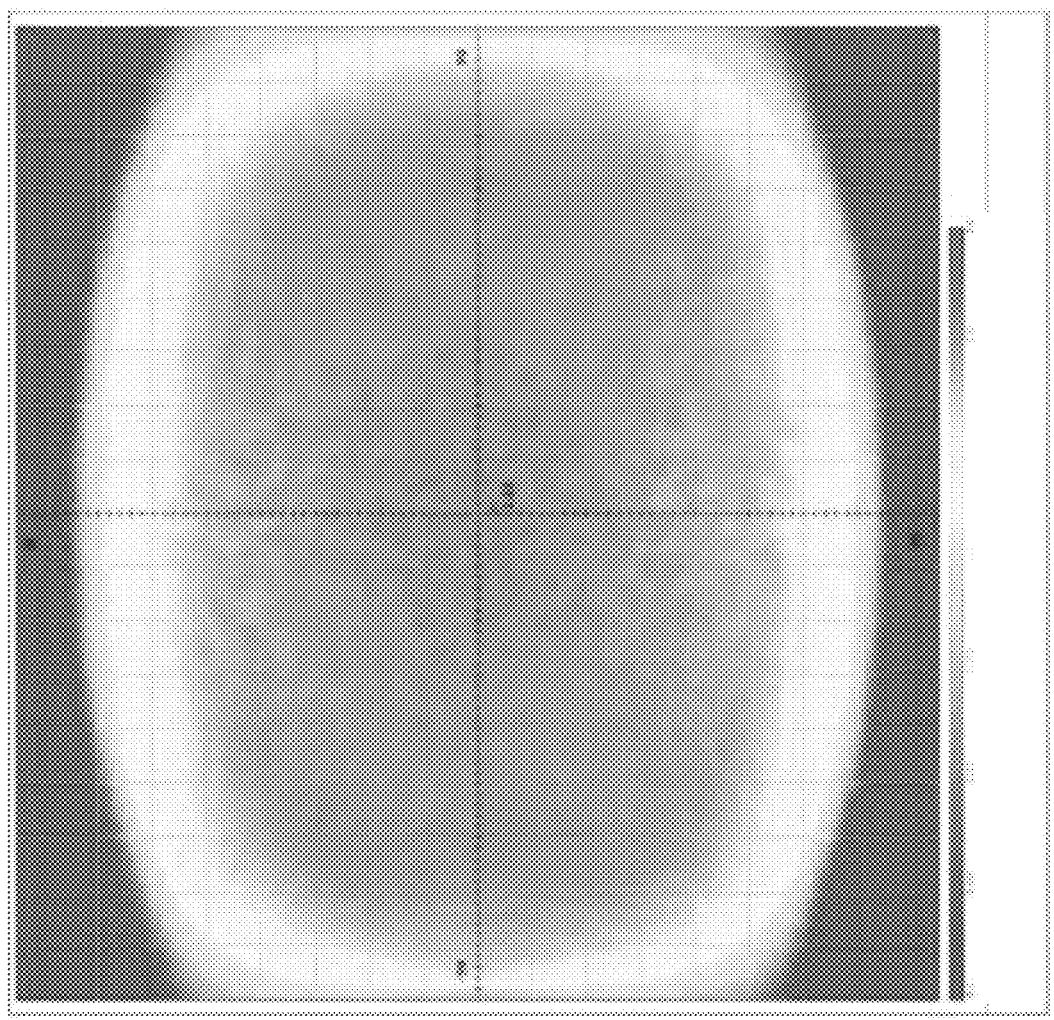
FIG. 22 is a plot of radiant intensity for an IR illuminator of FIG. 21.

FIG. 22 illustrates the performance of the IR illuminator with toric cover lens. Despite the rounded shaped substrate, the radiation intensity of the IR illuminator with toric cover lens has a comparable FOV to that of the IR illuminator with ellipsoid cover lens.

Numerous modifications and variations of the present invention are possible in light of the above teachings. It is therefore to be understood that within the scope of the appended claims, the invention may be practiced otherwise than as specifically described herein.

What is claimed is:

1. An IR illuminator for providing infrared light for a digital camera with a camera field of view, comprising;
    at least two mounting substrates arranged adjacent to the digital camera;
    at least one LED mounted to each of the mounting substrates for radiating the infrared light,
    where a surface of each of the mounting substrates of each LED mount location is angled off from a horizontal axis by an angle greater than zero degrees, where each angle of the respective surface of each mounting substrate is angled off the horizontal axis within a range of about five degrees to about seventy degrees;
    where at least one LED is associated with a first circular lens and a second circular lens, the second circular lens configured to redirect an emission of light radiation projected from the first circular lens such that a pattern of light radiation is emitted without entering into the camera lens.

2. The IR illuminator of claim 1, wherein the digital camera has an optic axis in a direction of focus and a horizontal axis that is orthogonal to the optic axis, and wherein a surface of each of the mounting substrates upon which the at least one LED is mounted is tilted from the horizontal axis by an angle greater than zero degrees.

3. The IR illuminator of claim 2, wherein the angle at which each of the mounting substrates is angled in a range of about five degrees to ten degrees.

4. The IR illuminator of claim 1, wherein the top surface of a second circular lens is positioned below the field of view of the camera.

5. The IR illuminator of claim 1, wherein the field of view of uniform emission of radiated light is greater than 70 degrees from a central direction that is the direction that the LED is facing.

6. The IR illuminator of claim 1, wherein the second circular lens has an outer surface having an outer cross section shape and an inner surface having an inner cross section shape, and
    wherein the inner cross section shape has a steeper angle than the outer cross section shape.

7. The IR illuminator of claim 1, wherein a peripheral shape of the second circular lens is elliptical.

8. The IR illuminator of claim 1, wherein a surface of the mounting substrate on which the at least one LED is mounted is rounded, and
    wherein the second circular lens is a tonic lens that substantially matches the rounded surface of the mounting surface.

9. The IR illuminator of claim 1, wherein the at least one LED includes two LEDs mounted equidistant from the center of the camera lens.

10. The IR illuminator of claim 1, wherein the camera has a field of view boundary that is curved, and wherein the cover lens has an outer ellipsoidal surface that conforms to the size and the shape of the curved field of view boundary.

11. An IR illuminator for providing infrared light for a digital camera with a field of view, comprising:
    at least two mounting substrates arranged adjacent to the digital camera;
    at least one LED mounted to each of the mounting substrates for radiating the infrared light,
    where at least one LED is associated with a first circular lens and a second circular lens, the second circular lens configured to redirect an emission of light radiation projected from the first circular lens;
    wherein a surface of each of the mounting substrates of each LED mount location is angled off from a horizontal axis by an angle greater than zero degrees,
    where the field of view of a uniform emission of radiated light is greater than 70 degrees from a central direction that faces in the direction that the at least one LED faces such that a pattern of light radiation is emitted without entering into a camera lens.

12. An IR illuminator for providing infrared light to a digital camera with a field of view, comprising:
    at least two mounting substrates arranged adjacent to the digital camera;
    at least one LED mounted to each of the mounting substrates for radiating the infrared light, where at least one LED is associated with a first circular lens and a second circular lens, the second circular lens configured to redirect an emission of light radiation projected from the first circular lens;
    wherein a surface of each of the mounting substrates of each LED mount location is angled off from a horizontal axis of the digital camera by an angle greater than zero degrees such that a pattern of light radiation is emitted without entering into a camera lens of the digital camera.

* * * * *